United States Patent
Tang et al.

(10) Patent No.: US 7,070,712 B2
(45) Date of Patent: Jul. 4, 2006

(54) ACETYLENE POLYMERS AND THEIR USE AS LIQUID CRYSTALS

(75) Inventors: Ben Zhong Tang, Kowloon (HK); Wing Yip Lam, Kowloon (HK); Xiangxing Kong, Kowloon (HK); Hoi Sing Kwok, Kowloon (HK)

(73) Assignee: The Hong Kong University of Science & Technology, Kowloon (HK)

( * ) Notice: Subject to any disclaimer, the term of this patent is extended or adjusted under 35 U.S.C. 154(b) by 0 days.

(21) Appl. No.: 11/103,657

(22) Filed: Apr. 12, 2005

(65) Prior Publication Data

US 2006/0022169 A1   Feb. 2, 2006

Related U.S. Application Data (63) Continuation of application No. 10/706,286, filed on Nov. 13, 2003, now abandoned, which is a continuation of application No. 10/346,360, filed on Jan. 17, 2003, now abandoned, which is a continuation of application No. 09/887,660, filed on Feb. 20, 2001, now abandoned, which is a continuation of application No. 09/352,778, filed on Jul. 14, 1999, now abandoned.

(51) Int. Cl.
C09K 19/20 (2006.01)
C07C 69/76 (2006.01)
C08F 138/02 (2006.01)

(52) U.S. Cl. ............ 252/299.65; 252/299.64; 252/299.67; 560/61; 560/64; 560/77; 526/285

(58) Field of Classification Search ........... 252/299.64, 252/299.65, 299.67; 560/61, 64, 76; 526/285
See application file for complete search history.

(56) References Cited

U.S. PATENT DOCUMENTS 5,475,133 A   12/1995   Douglas et al.

OTHER PUBLICATIONS

CAPLUS 1999:129341, "Synthesis, Mesomorphism, Isomerization, and Aromatization of Stereoregular Poly{[4-({[6-({[4'-)heptyl)oxy-4-biphenylyl]carbonyl}oxy)-hexyl]oxy}carbonyl)phenyl]acetylene}".

Vicentini et al., "Coupling order and conductivity Liquid crystalline conjugated polymers," Liquid Crystals, vol. 16, No. 5, pp. 721-733, 1994.

Kong, Xiangxing, et al., "Synthesis of Polyphenylacetylene Derivatives with Cyano Group," Department of Chemistry, The Hong Kong University of Science and Technology, Clear Water Bay, Kowloon, Hong Kong, 1 page.

Kong, Xiangxing, et al., "Synthesis of Poly(phenylacetylenes) Containing Polar Cyano Groups," Department of Chemistry, Hong Kong University of Science & Technology, Clear Water Bay, Kowloon, Hong Kong, Department of Chemistry, Peking University, Beijing 100871, China, 2 pages.

(Continued)

*Primary Examiner*—Shean C Wu
(74) *Attorney, Agent, or Firm*—Buchanan Ingersoll PC

(57) ABSTRACT

There is disclosed a liquid crystalline polyacetylene having a repeat structure of the formula

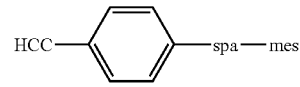

where spa is a spacer group and mes is a mesogenic substituent.

19 Claims, 6 Drawing Sheets

OTHER PUBLICATIONS

Kong et al., "Influence of Backbone Rigidity on The Thermotropic Behavior of Side-Chain Liquid Crystal Polyacetylenes," Department of Chemistry, The Hong Kong University of Science and Technology, Clear Water Bay, Kowloon, Hong Kong, Department of Polymer Science, College of Chemistry and Molecular Engineering, Peking University, 100871, Beijing, 2 pages.

Kong et al., "Liquid Crystalline Polyacetylenes with Phenylbenzoate Mesogens," Department of Chemistry, The Hong Kong University of Science and Technology, Clear Water Bay, Kowloon, Hong Kong, Department of Polymer Science, College of Chemistry and Molecular Engineering, Peking University, 100871, Beijing, 2 pages.

Lam, Wing Yip, et al., "Synthesis of liquid crystalline polyacetylenes," Department of Chemistry, The Hong Kong University of Science and Technology, Clear Water Bay, Kowloon, Hong Kong, 1 page.

Lam, Wing Yip, et al., "Synthesis and Properties of Liquid-Crystalline Polyacetylene," Department of Chemistry, The Hong Kong University of Science and Technology, Clear Water Bay, Kowloon, Hong Kong, 2 pages.

Kong, Xiangxing, et al., "Synthesis, Mesomorphism, Isomerization, and Aromatization of Stereoregular Poly{[4-({[6-({[4'-(heptyl)oxy-4-biphenylyl]carbonyl}oxy)-hexyl]oxy}carbonyl)phenyl]acetylene}," Macromolecules, vol. 32, No. 6, pp. 1722-1730, 1999.

CAPLUS 1997:488994, "Synthesis of poly(phenylacetylenes) containing polar cyano group."

RN 194670-09-2 Registry, 1997; RN 194670-08-1 Registry, 1997.

ACETYLENE POLYMERS AND THEIR USE AS LIQUID CRYSTALS

CROSS-REFERENCE TO RELATED APPLICATIONS

This application is a continuation application of U.S. patent application Ser. No. 10/706,286, filed Nov. 13, 2003 now abandoned, which is a continuation application of U.S. patent application Ser. No. 10/346,360, filed Jan. 17, 2003, now abandoned, which is a continuation application of U.S. patent application Ser. No. 09/887,660, filed Feb. 20, 2001, now abandoned, which is a continuation application of U.S. patent application Ser. No. 09/352,778, filed Jul. 14, 1999, now abandoned, wherein the contents of such applications are incorporated herein by reference.

FIELD OF THE INVENTION

The present invention relates to novel classes of mesogen containing acetylene polymers with particular, but by no means exclusive, reference to their use as liquid crystals. The present invention also relates to novel classes of mesogen containing acetylene monomers, and to polymerisation methods for producing said polymers from said monomers.

BACKGROUND OF THE INVENTION

Most industrially utilised plastics consist of polymers having flexible chains. In contrast, polymers having relatively rigid polymeric chains have proven far less useful in an industrial context, primarily due to processing difficulties associated with their low solubility and high melting temperature. This is despite the fact that rigid polymers can exhibit some very interesting properties.

For example, polyacetylene and associated derivatives thereof can exhibit electrical conductivity (when doped), chemical reactivity and complex forming ability. Another potential application is chiral separation. However, polyacetylene is completely intractable, insoluble and infusible, and has found few practical applications.

Thus there is a long felt need in the art for rigid chain polymers which possess some or all of the advantageous properties usually associated with this class of material, but which also possess desirable features, such as excellent tractability, which are, traditionally, associated with polymers having flexible backbones.

Liquid crystals are well known materials which are of enormous importance in a number of applications, such as visual display. Molecules which are disposed to form liquid crystalline phases usually adopt either rigid, elongate or disc shaped molecular structures. Molecular structures that form liquid crystalline phases are called mesogens.

Ringsdorf et al (Macromol. Chem., 179 (1978) 2541) have proposed that liquid crystals can be formed from a polymeric main chain having a mesogenic side group attached thereto via a flexible spacer (in order to decouple the motion of the main chain from the mesogenic side group). To date, attention has focused almost exclusively on the use of flexible polymeric main chains. Thus, the standard molecular architecture of a side-chain liquid crystalline polymer (SCLCP) is: flexible backbone+spacer+mesogenic group. Few rigid chain SCLCPs have been developed, and often these rigid chain SCLCPs are used as examples of the destructive role played by stiff polymeric backbones. In general, rigid polymeric backbones are regarded as defects which distort the packing arrangements of pendant mesogenic groups in SCLCPs. Thus, the received wisdom in the field teaches away from the use of rigid main polymeric chains in SCLCPs.

Tang et al (Macromolecules 30 (1997) 5620) polymerised, with difficulty, a phenylacetylene having a side chain comprising a spacer group and a mesogenic group (poly({4-[((n-((4$^1$-cyano-4-biphenylyl)oxy)alkyl)oxy)carbonyl]phenyl}acetylene)—shown below as Structure I).

Unfortunately, the polymer was not mesomorphic, i.e. did not exhibit liquid crystalline behaviour. It was believed that the nonmesomorphism of I is due to the high rigidity of the polyphenylacetylene backbone, a conclusion which teaches against the use of polyphenylacetylene backbones in SCLCPS.

Akagi and Shirakawa (Macromol. Symp., 104 (1996) 137) have polymerised a group of mesomorphic acetylene monomers which contain an ether functionality (such as HC≡C(CH$_2$)$_3$O-biph-C$_5$H$_{11}$, where biph is biphenyl) using a MoCl$_{5-Ph_4}$Sn catalyst. Tang et al (Macromolecules 31 (1998) 2419) polymerised a number of mesomorphic polyacetylenes, namely poly{n-[((4'-cyano-4-biphenylyl)oxy)carbonyl]-1-alkynes}.

SUMMARY OF THE INVENTION

In brief, the present invention is directed to mesogen containing acetylene polymers. The present invention has particular, but, by no means exclusive, reference to their use as liquid crystals. The polyacetylenes of the present invention possess the SCLCP molecular "architecture" of backbone+spacer+mesogenic group, but provide a rigid polymeric backbone which can have numerous interesting and useful electronic and mechanical properties, such as conductivity and molecular orientability. An additional, and considerable, advantage is that rigid chain polymers of the present invention are tractable, i.e. soluble and fusable. Furthermore, and in contrast to many polyacetylenes, polymers of the present invention exhibit excellent thermal stabilities.

In one aspect, the present invention provides a novel class of liquid crystalline polyphenylacetylene polymers having a repeat structure II.

II where spa is a spacer group and mes is a mesogenic substituent. It is surprising that polymers having such rigid backbones can exhibit liquid crystalline properties, particularly in view of the conclusion of Tang et al, ibid. The present invention also provides corresponding phenylacetylene monomers and efficient polymerisation methods for polymerising such monomers to produce polyphenylacetylenes in good yields.

In another aspect, the present invention provides novel classes of polyacetylenes having a repeat structure III.

III where spa 1 is a spacer group and mes is a mesogenic substituent selected from the group consisting of structures IV, V and VI.

where A, B and D are polar moieties, E is a polar moiety which is not cyano or methoxy, spa2 is a spacer group, and R is H or an alkyl group.

The present invention is particularly concerned with the liquid crystalline forms of these polyacetylenes. However, non-mesomorphic phases may be of practical use: for example, electrically conducting polyacetylenes might be produced by doping, and such conducting polyacetylenes might have numerous applications, for example as a sensing medium in an analyte sensor.

The present invention also provides corresponding acetylene monomers and efficient polymerisation methods for polymerising such monomers to produce polyacetylenes in good yields. Many of the monomers exhibit liquid crystal behaviour.

DETAILED DESCRIPTION OF THE INVENTION

The present invention provides liquid crystal polyphenylacetylenes having a repeat structure II, wherein spa is a spacer group and mes is a mesogenic substituent.

A preferred mesógenic substituent is a substituted biphenyl group, although other mesogenic substituents, such as, for example, Ph-X-ph-Y(where X and Y are, respectively, a linking group and a terminal group, and are preferably polar, and Ph is a phenyl group) may be used instead.

Suitable spacer groups spa would suggest themselves to those skilled in the art. Alkyl chains are well suited: primary alkyl chains are preferred, although other alkyl chains might be utilised provided that they are not so bulky as to inhibit packing in the mesophase. In general, the longer the alkyl chain, the more flexible the spacer group.

Preferred embodiments of polyphenylacetylenes of the present invention have a repeat structure VII

VII where n is greater than 1, and A, B and C are polar moieties. Typically n is in the range 1 to 12, although the use of longer alkyl chains is also feasible. A and B can be COO, OCO or O. C can be CN, OH, CO₂H, OR, CO₂R or OCOR where R is a substituent such as an alkyl group.

The present invention also provides polyacetylene polymers having a repeat structure III, in which the mesogenic substituent mes can be a structure IV, V or VI. Referring to structures IV, V and VI, A, B and D are polar moieties, E is a polar moiety which is not cyano or methoxy, and R is H or an alkyl group. In preferred embodiments, A and B can be OCO, COO or O, and E can be OH, $CO_2H$, $O(CH_2)_{m-1}CH_3$, $OCO(CH_2)_{m-1}CH_3$ or $CO_2(CH_2)_{m-1}CH_3$ where m is greater than one.

The polyacetylenes of the present invention can be prepared using molybdenum, tungsten and rhodium catalysts such as $MoCl_5$, $MoCl_5$-$Ph_4Sn$, $WCl_6$, $WCl_6$-$Ph_4Sn$, W(mes)$(CO)_3$, $Mo(nbd)(CO)_4$, $[Rh(nbd)Cl]_2$, $[Rh(cod)Cl]_2$, Rh(cod)(bbpmt), Rh(cod)(pip)Cl, Rh(cod)(NH$_3$)Cl, Rh(cod)(t-BuNH$_3$)Cl, Rh(cod)(mid)Cl, $[RH(cod)mid)_2]$ $PF_6$, $[Rh(cod)Cl]_2$(pda), Rh(nbd)(tos)($H_2O$) and Rh(cod)(tos)($H_2O$), where mes=mesitylene, nbd=2,5-norbornadiene, cod=1,5 cyclooctadiene, bbpmt=bis(4-t-butyl)-2-pyridylmethylthiolate, pip=piperidine, mid=N-methylimidazole, pda=O-phenylenediamine, tos=p-toluenesulphonate.

Rh based catalysts are preferred for the polymerisation of phenylacetylenes. W based catalysts are preferred for the polymerisation of alkyl acetylenes.

Materials

Dioxane (Aldrich), THF (Lab-Scan), and toluene (BDH) were predried over 4 Å molecular sieves and distilled from sodium benzophenone ketyl immediately prior to use. Triethylamine (Aldrich) was also predried but purified from calcium hydride by simple distillation. 4'-Hydroxy-4-biphenyl-carboxylic acid, 1,3-dicyclohexylcarbodiimide (DCC), 4-(dimethylamino) pyridine (DMAP), and p-toluenesulfonic acid (TsOH) were all purchased from Aldrich. The rhodium complexes $[Rh(nbd)Cl]_2$, Rh(nbd)(tos)($H_2O$), $[Rh(nbd)(PMe_3)_3]PF_6$, $[Rh(cod)C]_2$, Rh(cod)(tos)($H_2O$), Rh(cod)$NH_3$)Cl, and Rh(cod)-(pip)Cl were synthesised according to procedures well known in the art. All other commercial reagents including the metal halide catalysts were purchased from Aldrich and used as received without further purification. Technical grade acetone was used to precipitate the polymeric products.

Instrumentation Infrared (IR) spectra were recorded on a Perkin-Elmer 16 PC FT-IR spectrophotometer. $^1H$ and $^{13}C$ NMR spectra were measured on a Bruker ARX 300 NMR spectrometer using chloroform-d or dichloromethane-$d_2$ as solvent. Tetramethylsilane (δ=0), chloroform (δ=7.26), and/or dichloromethane (δ=5.38) were used as internal references for the NMR analysis. UV-vis spectra were recorded on a Milton Roy Spectronic 3000 array spectrophotometer, and molar absorptivity (ϵ) was calculated on the basis of the repeat units of the polymers. Mass spectra (MS) were recorded on a Finnigan TSQ 7000 triple quadrupole mass spectrometer operating in a chemical ionization (CI) mode using methane as carrier gas. Elemental analysis was performed by a commercial analytical company, M-H-W Laboratories. Molecular weights of the polymers were estimated by a Waters Associates gel permeation chromatography (GPC) using 12 monodisperse polystyrenes (molecular weight range $10^2$–$10^7$) as calibration standards. Differential scanning calorimetry (DSC) analysis was carried out on a Setaram DSC 92 under nitrogen at a scanning rate of 10° C./min. An Olympus BX 60 polarised optical microscope (POM) equipped with a Linkam TMS 92 hot stage was used in cross-polarised mode for the visual observation of mesomorphic textures. X-ray diffraction (XRD) patterns were recorded on a Philips PW 1830 powder diffractometer at room temperature using a monchromatised X-ray beam from nickel-filtered Cu Kα radiation with a wavelength of 1.5406 Å (scan rate 0.01°/s; scan range 2–30°). The samples for the XRD experiments were prepared by quickly quenching by liquid nitrogen the polymers annealed at their liquid crystalline states.

EXAMPLE 1

Poly{[4-({[6-({[4'-(heptyl)oxy-4-biphenylyl]carbonyl}oxy)hexyl]oxy}carbonyl)phenyl]acetylene} (VIII)

VIII

Monomer Synthesis

Figure 1:
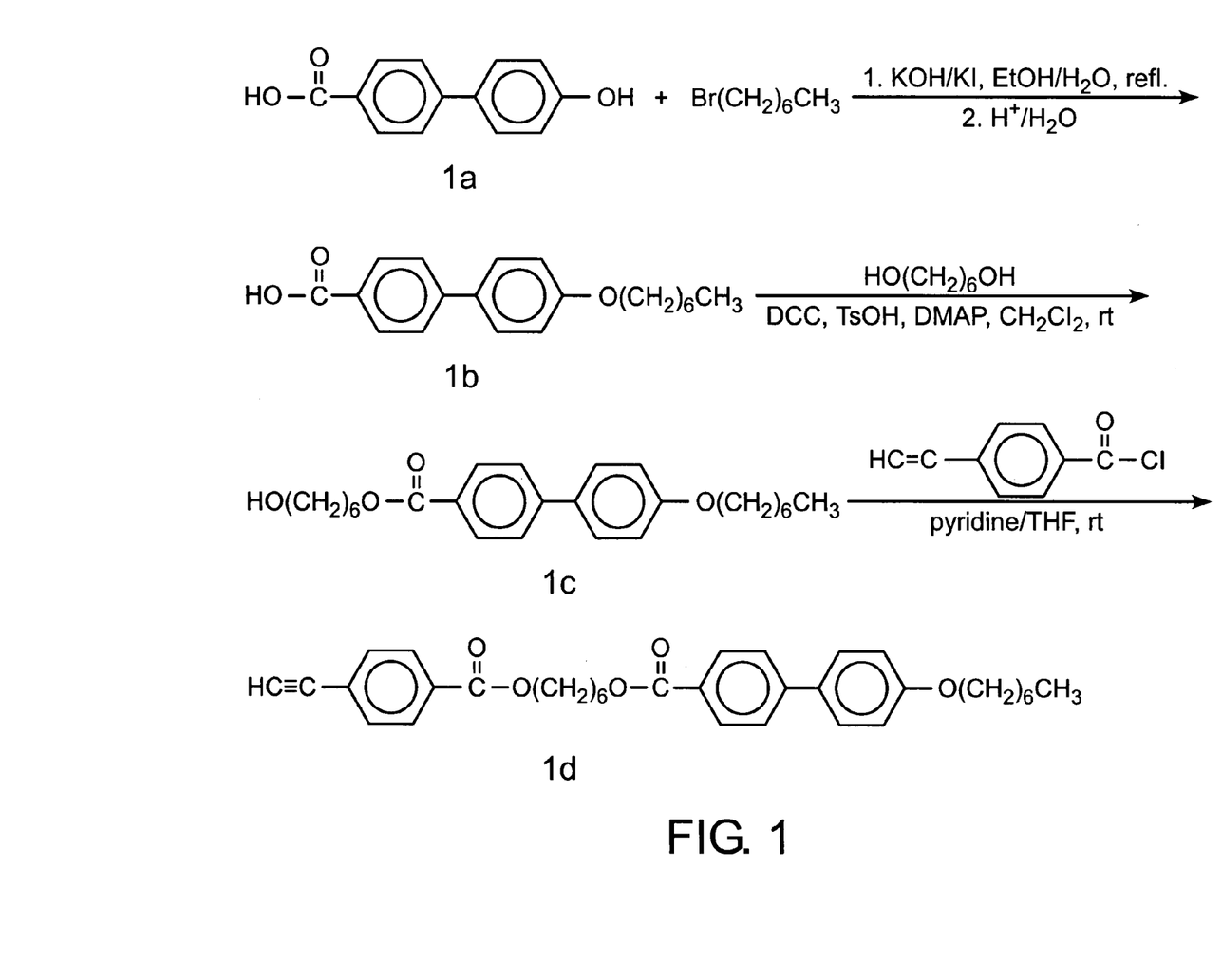
FIG. 1 shows a reaction scheme for the synthesis of [4-({[6-({[4'-(heptyl)oxy-4-biphenylyl]carbony}oxy)hexyl]oxy}carbonyl)phenyl]acetylene.

The phenylacetylene derivative 1 was synthesised by the multiple-step reactions shown in FIG. 1. Detailed experimental procedures and characterisation data are given below.

4'-(Heptyl)oxy-4-biphenylylcarboxylic Acid(1b). In a 1000 mL round-bottom flask equipped with a condenser, 10 g (46.7 mmol) of 1a, 5.23 g of KOH (93.5 mmol), and a catalytic amount of KI were dissolved in 500 mL of ethanol/water mixture (6:1 by volume) under gentle heating and stirring. To the solution was added 12 g (67 mmol) of 1-bromoheptane, and the resulting mixture was refluxed for 30 h. The reaction mixture was poured into 300 mL of water acidified with 20 mL of 37% hydrochloric acid. The solid was collected by suction filtration. Recrystallisation in glacial acetic acid gave 9 g of white crystalline product (yield 61.7%). IR (KBr), ν ($cm^{-1}$): 3200–2300 (br. $CO_2H$), 1684 (s, C—O). $^1H$ NMR (300 MHz, DMSO-$d_6$) δ (ppm): 12.95 (s, $CO_2H$), 8.09 (d, 2H, Ar—H ortho to $CO_2H$), 7.83 (m, 4H, Ar—H), 7.14 (d, 2H, Ar—H ortho to OC$_7$H$_{15}$), 4.11 (t, 2H, OCH$_2$), 1.83 (m, 2H, OCH$_2$CH$_3$), 1.48 [m, 8H, (CH$_2$)$_4$], 0.97 (t, 3H, CH$_3$). $^{13}$C NMR (75 MHz, DMSO-d$_6$). δ(ppm): 167.41 (C—O), 159.20 (aromatic carbon linked with OC$_7$H$_{15}$), 144.15 (aromatic carbon para to CO$_2$H), 131.28 (aromatic carbon para to OC$_7$H$_{15}$), 130.15 (aromatic carbons ortho to CO$_2$H), 128.91 (aromatic carbon linked with CO$_2$H), 128.32 (aromatic carbons meta to CO$_2$H), 126.28 (aromatic carbons meta to OC$_7$H$_{15}$), 115.21 (aromatic carbons ortho to OC$_7$H$_{15}$), 67.77 (OCH$_2$), 31.45 (CH$_2$C$_3$H$_7$), 28.87 (CH$_2$C$_2$H$_5$), 28.64 (OCH$_2$CH$_2$), 25.68 (OC$_2$H$_4$CH$_2$), 22.26 (CH$_2$CH$_3$). 14.16 (CH$_3$).

6-Hydroxy-1-hexyl[4-(heptyl)oxy-4-biphenyl]carboxylate(1c). 4'-(Heptyl)oxy-4-biphenylylcarboxylic acid (1.7 g, 5.44 mmol), 1,6-hexanediol (1.3 g, 11 mmol), TsOH (0.2 g, 1.16 mmol), and DMAP (0.1 g, 0.82 mmol) were dissolved in 400 mL of dry CH$_2$Cl$_2$ in a 500 mL two-necked flask under nitrogen. The solution was cooled to 0–5° C. with an ice bath, to which 1.8 g of DCC (7.5 mmol) in 50 mL of dichloromethane was added under stirring via a dropping funnel with a pressure-equalisation arm. The mixture was stirred at room temperature overnight. After filtering out the formed insoluble urea crystals, the filtrate was concentrated by a rotary evaporator. The crude product was purified by a silica gel column using CHCl$_3$/acetone mixture (10:1 by volume) as eluent. After recrystallisation from ethanol/water (3:1 by volume), 1.6 g of white crystalline product was obtained (yield 71.3%). IR (KBr), ν (cm$^{-1}$): 3316 (br, OH), 1714 (s, C=O). $^1$H NMR (300 MHz, CDCl$_3$), δ (ppm): 8.35 (d, 2H, Ar—H ortho to CO$_2$R), 7.58 (m, 4H, Ar—H), 7.00 (d, 2H, Ar—H ortho to OC$_7$H$_{15}$), 4.34 (t, 2H, CH$_2$OCO), 4.00 (t, 2H, OCH$_2$), 3.67 (t, 2H$_1$ HOCH$_2$), 1.81 (m, 4H CH$_2$CH$_2$OCO, OCH$_2$CH$_2$), 1.61-1.35 [m, 14H, (CH$_2$)$_7$], 0.90 (t, 3H,CH$_3$). $^{13}$C NMR (75 MHz, CDCl$_3$, δ (ppm): 166.64 (C=O), 159.45 (aromatic carbon linked with OC$_7$H$_{15}$), 145.24 (aromatic carbon para to CO$_2$R), 131.91 (aromatic carbon para to OC$_7$H$_{15}$), 130.03 (aromatic carbons ortho to CO$_2$R), 128.51 (aromatic carbon linked with CO$_2$R), 128.29 (aromatic carbons meta to OC$_7$H$_{15}$), 126.40 (aromatic carbons meta to CO$_2$R), 114.96 (aromatic carbons ortho to OC$_7$H$_{15}$), 68.17 (PhOCH$_2$), 64.85 (CH$_2$OCOPh), 62.88 (HOCH$_2$), 32.64 (HOCH$_2$—CH$_2$), 31.77 (CH$_2$C$_3$H$_7$), 29.26 (CH$_2$CH$_2$OCOPh), 29.04 (CH$_2$C$_2$H$_5$), 28.94 (PhOCH$_2$CH$_2$(, 26.00[HO(CH$_2$)$_2$CH$_2$], 25.87 [HO(CH$_2$)$_3$CH$_2$], 25.43 (PhOC$_2$H$_4$CH$_2$), 22.59 (CH$_2$CH$_3$), 14.05 (CH$_3$).

[4-({[6-({[4'-(Heptyl)oxy-4-biphenylyl]carbonyl}oxy)-hexyl]oxy}carbonyl)phenyl]acetylene(1d). Into a 50 mL two-necked round-bottom flask were added 0.8 g (5.5 mmol) of 4-ethynylbenzoic acid, 2 mL of thionyl chloride, and 15 mL of THF. After refluxing for 2 h, the solvent and excess SOCl$_2$ were distilled off under reduced pressure. The solid left in the flask was dissolved in 15 mL of THF and cooled to 0–5° C. using an ice bath. A solution of 1c (2.2 g, 5.3 mmol) and pyridine (0.6 mL) in 25 mL of THF was injected into the flask, and the mixture was slowly warmed to room temperature and stirred overnight. THF was evaporated using a rotary evaporator. The solid residue in the flask was dissolved in 50 mL of chloroform, and the solution was washed with water and dried over anhydrous magnesium sulfate. The crude product was purified on a silica gel column using dichloromethane as eluent. Recrystallisation from absolute ethanol gave 1.2 g of white crystalline product (yield 45%). IR (KBr), ν (cm$^{-1}$): 3312 (s, HC≡), 1714 (s, C=O), 648 (s, ≡C—H). $^1$H NMR (300 MHz, CDCl$_3$), δ (ppm): 8.06 (d, 2H, Biph-H; Biph=biphenyl), 8.00 (d, 2H Ph-H meta to HC=C), 7.57 (m, 6H, Ph-H ortho to HC=C), 7.00 (d, 2H, Biph-H ortho to OC$_7$H$_{15}$), 4.35 (m, 4H, CH$_3$OCO, CO$_2$CH$_2$), 4.00 (t, 2H, OCH$_2$), 3.22 (s, 1H, HC≡), 1.81 (m, 6H, CH$_2$CH$_2$OCO, CO$_2$CH$_2$CH$_2$, OCH$_2$CH$_2$), 1.55–1.29 [m,12H, (CH$_2$)$_6$], 0.90 (t, 3H, CH$_3$). $^{13}$C NMR (75 MHz, CDCl$_3$), δ (ppm): 166.60 (C=O), 165.90 (C=O), 159.40 (aromatic carbon linked with OC$_7$H$_{15}$), 145.20 (aromatic carbon linked with PhOC$_7$H$_{15}$), 132.20 (aromatic carbons ortho to HC≡C), 132.00 (aromatic carbon para to OC$_7$H$_{15}$), 130.40 (aromatic carbons meta to HC≡C), 130.00 (aromatic carbon para to HC≡C), 129.40 (aromatic carbons meta to PhOC$_7$H$_{15}$). 128.40 (aromatic carbon para to PhOC$_7$H$_5$), 128.30 (aromatic carbons ortho to PhOC$_7$H$_{15}$), 126.70 (aromatic carbon linked with HC≡C), 126.40 (aromatic carbons meta to OC$_7$H$_{15}$), 114.90 (aromatic carbons ortho to OC$_7$H$_{15}$), 82.80 (≡C), 79.90 (HC≡), 68.10 (PhOCH$_2$), 65.10 (≡CPhCO$_2$CH$_2$), 64.80 (CH$_2$OCOBiph), 31.80(CH$_2$C$_3$H$_7$), 29.20 (CH$_2$CH$_2$OCOBiph), 29.00 (≡CPhCO$_2$CH$_2$CH$_2$), 28.70 (CH$_2$C$_2$H$_5$), 28.60 (OCH$_2$CH$_2$), 26.00(≡CPhCO$_2$C$_2$H$_4$CH$_2$) 25.79 (CH$_2$C$_2$H$_4$OCOBiph), 25.77 [BiphO(CH$_2$)$_2$CH$_2$], 22.60 (CH$_2$CH$_3$), 14.00 (CH$_3$). MS (CI; CH$_4$): m/e 540.7 [M$^+$. calcd 540.3]. Anal. Calcd for C$_{35}$H$_{40}$O$_5$: C, 77.78; H, 7.41. Found: C, 75.35; H 7.39.

Polymerisation

All the polymerisation reactions and manipulations were carried out under a nitrogen gas atmosphere using an inert-atmosphere glovebox (Vacuum Atmospheres) or Schlenk techniques in a vacuum line system, except for the purification of the polymers, which was done in an open atmosphere. A typical procedure for the polymerisation of 1d catalysed by [Rh(nbd)Cl]$_2$ is given below. Into a baked 20 mL Schlenk tube with a three-way stopcock on the sidearm was added 227.0 mg of 1d. The tube was evacuated under vacuum and then flushed with dry nitrogen three times through the sidearm. One millilitre of THF/ET$_3$N mixture (4:1 by volume) was injected into the tube to dissolve the monomer. The catalyst solution was prepared in another tube by dissolving 9 mg of [Rh(nbd)Cl]$_2$ in 1 mL of THF/Et$_a$N mixture (4:1 by volume). The monomer solution was then transferred to the catalyst solution using a hypodermic syringe. The polymerisation mixture was stirred under nitrogen at room temperature for 24 h. The mixture was then diluted with 5 mL of THF and added dropwise to 500 mL of acetone under stirring through a cotton filter. The precipitate was allowed to stand overnight, which was then filtered by a Gooch crucible, washed with acetone, and dried in a vacuum oven to a constant weight. A yellow powdery polymer was obtained in 93.0% yield. M$_w$=637 500 M$_w$/M$_n$=5.23 (GPC, polystyrene calibration). IR (KBr), ν(cm$^{-1}$); 3036 (w, =C—H), 1716 (s, C=O). $^1$H NMR (300 MHz, CD$_2$Cl$_2$), δ (ppm): 7.91 (Biph-H), 7.58 (Ph-H meta to backbone), 7.45 (Biph-H), 6.84 (Ph-H meta to backbone), 6.68 (Ar—H), 5.76 (cis =C—H), 4.16 (CH$_2$OCO), 3.86

(OCH$_2$), 1.68 (OCH$_2$CH$_2$) 1.38–1.25[O(CH$_2$)$_2$(CH$_2$)$_2$, (CH$_2$)$_4$CH$_3$], 0.84 (CH$_3$). $^{13}$C NMR (75 MHz, CD$_3$Cl$_2$), δ (ppm): 166.52 (C=O), 165.97 (C=O), 159.85 (aromatic carbon linked with OC$_7$H$_{15}$), 146.45 (≡C—), 145.23 (aromatic carbon linked with PhOC$_7$H$_{15}$), 139.57 (aromatic carbon linked with backbone), 132.18 (aromatic carbon para to OC$_7$H$_{15}$), 130.28 (aromatic carbon meta to PhOC$_7$H$_{15}$), 129.70 (H—C≡, aromatic carbons meta and para to backbone), 128.92 (aromatic carbon para to PhOC$_7$H$_{15}$), 128.51 (aromatic carbon ortho to PhOC$_7$H$_{15}$), 127.66 (aromatic carbon ortho to backbone), 126.54 (aromatic carbon meta to OC$_7$H$_{15}$), 115.17 (aromatic carbons ortho to OC$_7$H$_{15}$), 68.46 (PhOCH$_2$), 65.14 (≡CPhCO$_3$CH$_2$. CH$_2$OCOBiph), 32.19 (CH$_2$C$_8$H$_7$),29.67 (CH$_2$CH$_2$OCOBiph), 29.48 (≡CPhCO$_2$CH$_2$CH$_2$) 29.04 (CH$_2$C$_2$H$_5$), 26.37 (CH$_2$C$_2$H$_4$OCOBiph), 26.08 [PhO(CH$_2$)$_2$—CH$_2$], 23.01 (CH$_2$CH$_3$), 14.25 (CH$_3$). UV (THF, 8.52×10$^{-5}$ mol/L), λ$_{max}$ (nm)/ε$_{max}$(mol$^{-1}$ L cm$^{-1}$): 295/29×10$^3$, 426/3.1×10$^3$ (sh).

It is known that metathesis catalysts such as WCl$_6$ and MoCl$_5$ can polymerise substituted acetylenes. An attempt was made to polymerise 1d using the WCl$_6$ and MoCl$_5$ based catalysts. It is found, however, that the tungsten and molybdenum halides are ineffective or poor catalysts for the polymerisation of 1d (Table 1, nos. 1–4).

In contrast, Rh-nbd complexes work well for the polymerisation of 1d. For example, when [Rh(nbd)Cl]$_2$ is used to initiate the polymerisation of 1d in a mixture of THF and triethylamine, an orange polymer is obtained in high yield (93.0%) after 24 h polymerisation (Table 1, no. 5). The polymer has a high molecular weight. (M$_n$=1.22×10$^5$) and possesses high stereoregularity (cis content 92%).

measurments on samples of VIII quenched by liquid nitrogen from 140° C. confirm the smecticity of the mesophase.

EXAMPLE 2

Poly{5-[(4'-{[(undecyl)carbonyl]oxy}biphenyl-4-yl)oxy]-1-pentyne}(1X)

IX

Monomer Synthesis

TABLE 1

Polymerisation of [4-({[6-({[4'-(Heptyl)oxy-4-biphenylyl]carbonyl}oxy)hexyl]oxy}carbonyl)phenyl]acetylene[a]

| No. | catalyst[b] | solvent | yield % | M$_n$[c] | M$_w$/M$_n$[c] | cis %[d] |
|---|---|---|---|---|---|---|
| 1 | WCl$_6$—Ph$_4$Sn | dioxane | 0 | | | |
| 2 | WCl$_6$—Ph$_4$Sn | toluene | 7.2 | 28 200 | 2.04 | |
| 3 | MoCl$_5$—Ph$_4$Sn | dioxane | 0 | | | |
| 4 | MoCl$_5$—Ph$_4$Sn | toluene | 10.2 | 14 200 | 2.33 | |
| 5 | [Rh(nbd)Cl]$_2$ | Et$_3$N/THF[e] | 93.0 | 122 000 | 5.23 | 92 |
| 6 | Rh(nbd)(tos)(H$_2$O) | THF | 0 | | | |
| 7 | [Rh(nbd)(PMe$_3$)$_3$]PF$_6$ | THF | 5.7 | 79 200 | 9.64 | 78 |
| 8 | [Rh(cod)Cl]$_2$ | Et$_3$N/THF[e] | 85.7 | 83 800 | 4.60 | 91 |
| 9 | Rh(cod)(tos)(H$_2$O) | THF | 73.5 | 26 800 | 3.93 | 85 |
| 10 | Rh(cod)(NH$_3$)Cl | THF | 93.1 | 62 600 | 6.38 | 92 |
| 11 | Rh(cod)(pip)Cl | THF | 92.8 | 72 400 | 5.33 | 91 |

[a]At room temperature under nitrogen for 24 h: [M]$_0$ = 0.2 M, [cat.] = ([cocat.] = 10 mM.
[b]Abbreviation: nbd = 2,5-norbordiene, tos = p-toleuenesulfonate, cod = 1.5-cyclooetadiene, pip = piperidine.
[c]Determined by GPC in THF on the basis of a polystyrene calibration
[d]Determined by $^1$H NMR spectra.
[e]Volume ratio of Et$_3$N to THF: 1:4.

Liquid Crystal Behaviour

Figure 2:
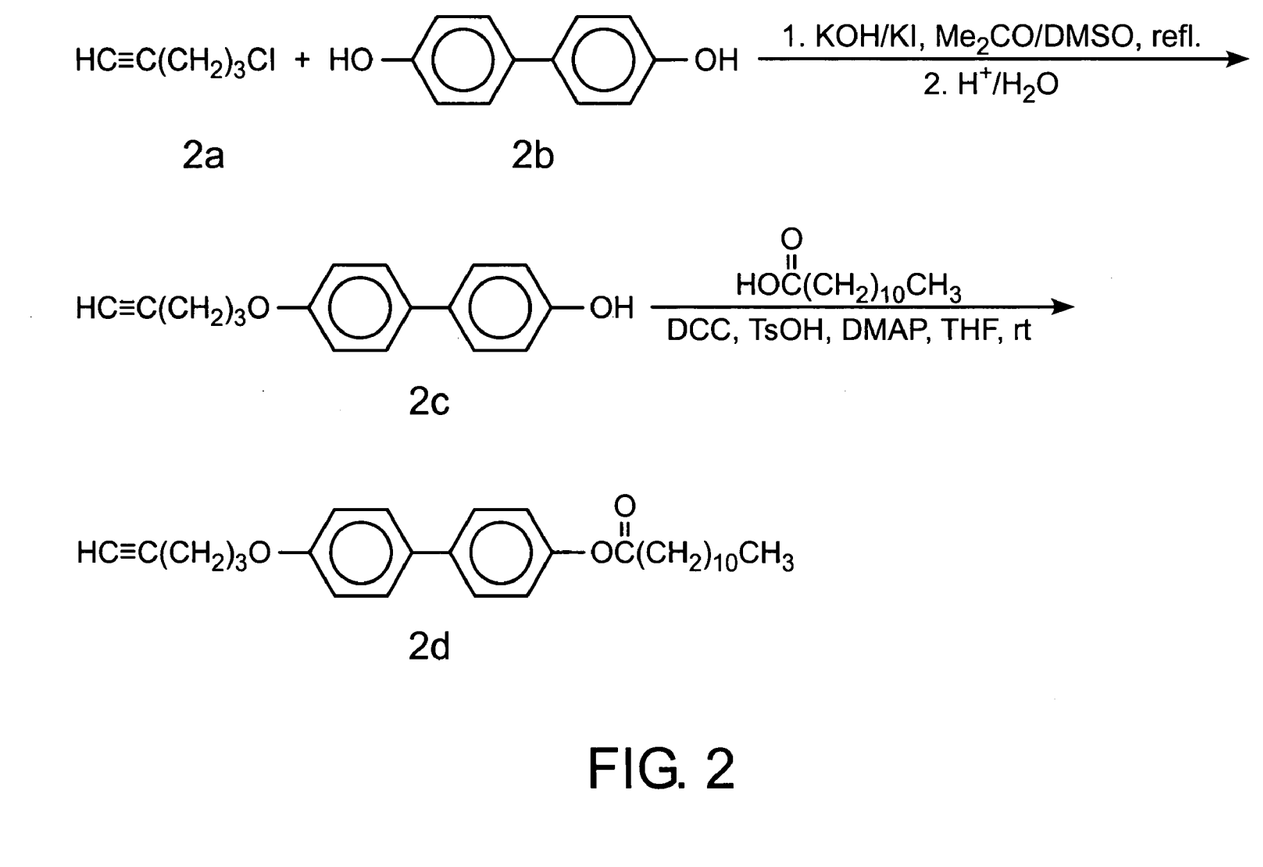
FIG. 2 shows a reaction scheme for the synthesis of 5-[(4¹-{[(undecyl)carbonyl]oxy}-biphenyl-4-yl)oxy]-1-pentyne.

POM microphotographs taken after a melted sample of VIII was cooled to and annealed at 133.6° C. reveal many small bâtonnet structures. Closer inspection revealed the existence of tiny bands, the directors of which are prependicular to the longitudinal axes of the bâtonnets, suggesting that the mesophase of VIII is smectic A in nature. XRD The acetylene derivative was synthesised by the multiple step reactions shown in FIG. 2. Detailed experimental procedures and characterisation data are given below.

(4-Hydroxy-biphenyl-4-yl)oxy-1-pentyne(2c)

In a 1000-mL Erlenmeyer flask equipped with a condenser, 10 g (53.7 mmol) of 4–4' biphenol and 3.3 g of KOH (58.8 mmol) were dissolved in 400 mL of acetone/DMSO mixture (v/v: 10:1) under gentle heating and stirring. To the homogeneous solution were added 5.5 g (53.6 mmol) of 5-chloro-1-pentyne and a catalytic amount of potassium iodide. The resulting mixture was then refluxed for 30 h. The solution was poured into 300 mL of water, acidified with 15 mL of 37% concentrated hydrochloric acid. The solid was collected by suction filtration, washed with water and dried in vacuum oven. The crude product was purified on a silica-gel column using chloroform first as eluent, then chloroform-acetone mixture (v/v: 10:1). Recrystallization from toluene gave 5 g of product. White crystals; yield: 33%

IR (KBr), $v(cm^{-1})$: 3375 (br, OH), 3304 (HC≡), 1250 (≡C—H overtone), 636 (≡C—H)

$^1$H NMR (300 MHz, DMSO-$d_6$), δ(ppm): 9.57 (s, OH), 7.52 (m, 4H, Ar—H), 7.05 (d, 2H, Ar—H ortho to $OC_5H_7$), 6.92 (d, 2H, Ar—H ortho to OH), 4.14 (t, 2H, $OCH_2$), 2.92 (t, 1H, HC≡), 2.44 (td, 2H, ≡C—$CH_2$), 1.99 (m, 2H, $OCH_2CH_2$)

$^{13}$C NMR (75 MHz; DMSO-$d_6$), δ (ppm): 157.6 (aromatic carbon attached to $OC_5H_7$), 156.7 (aromatic carbon attached to OH), 131.0 (aromatic carbon para to OH), 130.9 (aromatic carbon para to $OC_5H_7$), 127.4 (aromatic carbons meta to OH), 127.2 (aromatic carbons meta to $OC_5H_7$), 115.9 (aromatic carbons ortho to OH), 115.0 (aromatic carbons ortho to $OC_5H_7$), 83.9 (≡C), 71.9 ($OCH_2$), 66.1 (HC≡), 28.0 (≡C—$CH_2CH_2$), 14.7 (≡C—$CH_2$)

5-[(4'-{[(Undecyl)carbonyl]oxy}-biphenyl-4-yl)oxy]-1-pentyne(2d)

Lauric acid (2.9 g, 14.5 mmol), 5-[4'-(hydroxy-biphenyl-4-yl)oxy]-1-pentyne (3.6 g, 14.3 mmol), TsOH (0.6 g, 3.5 mmol) and DMAP (0.4 g, 3.3 mmol) were dissolved in 250 mL of dry THF in a 500 mL two-necked flask under nitrogen. The solution was cooled down to 0-5° C. with an ice-water bath, to which 4.6 g of DCC (22.3 mmol) dissolved in 50 mL of THF was added with stirring via a dropping funnel with a pressure-equalization arm. The reaction mixture was stirred overnight. After filtering out the formed urea solid, the solution was concentrated by rotary evaporator. The product was purified by column chromatography using chloroform as eluent. Recrystallization from absolute ethanol gave 5 g of product. White crystals; yield: 87%

IR (KBr), $v(cm^{-1})$: 3300 (s, HC≡), 1748 (s, C═O), 630 (≡C—H bending)

$^1$H NMR (300 MHz, CDCl$_3$), δ (ppm): 7.52 (m, 4H, Ar—H), 7.12 (d, 2H, Ar—H ortho to $OCOC_{11}H_{25}$), 6.97 (d, 2H, Ar—H ortho to $OC_5H_7$), 4.12 (t, 2H, $OCH_2$), 2.57 (t, 2H, $OCOCH_2$), 2.43 (td, 2H, ≡C—$CH_2$), 2.01 (m, 3H, ≡C—H and $OCH_2CH_2$), 1.77 (m, 2H, $OCOCH_2CH_2$), 1.43–1.28 [m, 16H, $(CH_2)$], 0.89 (t, 3H, $CH_3$)

$^{13}$C NMR (75 MHz, CDCl$_3$), δ (ppm): 172.4 (C═O), 158.4 (aromatic carbon attached to $OC_5H_7$), 149.6 (aromatic carbon attached to $OCOC_{11}H_{25}$), 138.4 (aromatic carbon para to $OCOC_{11}H_{25}$), 132.9 (aromatic carbon para to $OC_5H_7$), 128.0 (aromatic carbons meta to $OCOC_{11}H_{25}$), 127.6 (aromatic carbons meta to $OC_5H_7$), 121.7 (aromatic carbons ortho to $OCOC_{11}H_{25}$), 114.7 (aromatic carbons ortho to $OC_5H_7$), 83.3 (≡C), 68.9 ($OCH_2$), 66.1 (HC≡), 34.5 ($OCOCH_2$), 31.9 ($CH_2CH_2CH_3$), 29.6, 29.4, 29.3, 29.2, 29.1, 28.1, 24.9, 22.7, 22.6, 15.1 (≡C—$CH_2$), 14.1 ($CH_3$)

MS (CI): m/e: 435.3 [(M+1)$^+$ calcd 435.3)]

Anal calcd for $C_{29}H_{38}O_3$: C;80.13, H; 8.82. Found: C, 80.00, H; 8.49.

Polymerisation

Typical experimental procedures for polymerizing 2d using a WCl$_6$-Ph$_4$Sn catalyst is given below. Into a baked 20 mL Schlenk tube side arm was added 375.0 mg (0.8 mmol) of monomer. The tube was evacuated under vacuum and then flushed with dry nitrogen three times through the side arm. 2 mL of 1,4-dioxane was injected into the tube to dissolve the monomer. The catalyst solution was prepared in another tube by dissolving 16.0 mg of tungsten (VI) chloride and 17.0 mg of tetraphenyltin in 2 mL of 1,4-dioxane. After the tubes were aged at room temperature for 15 minutes, the monomer solution was transferred to the catalyst solution by hypodermic syringe. The reaction mixture was stirred at room temperature under nitrogen for 24 hours. The mixture was then diluted with 5 mL of chloroform and added dropwise to 500 mL of acetone under stirring. The precipitate was allowed to stay overnight, which was then filtered off by a Gooch crucible, washed with acetone, and dried in vacuum oven to a constant weight. Red powdery solid; yield: 68.9% $M_w$: 18600, $M_w/M_n$: 2.48 (GPC, polystyrene calibration)

IR (KBr), $v(cm^{-1})$: 1756 (C═O)

$^1$H NMR (300 MHz, CDCl$_3$) δ (ppm): 7.35, 7.00, 6.82 (Ar—H and trans ═C—H), 6.15 (cis═C—H), 3.87 ($OCH_2$), 2.56 ($CO_2CH_2$), 2.1(═C—$CH_2$), 1.81 ($CO_2CH_2CH_2$), 1.35 [$(CH_2)_9$], 0.96 ($CH_3$).

$^{13}$C NMR (75 MHz, CDCl3), δ (ppm): 172.1 (C═O), 158.5, 149.7, 138.0, 132.5 127.9, 127.4, 121.8, 114.7, (aromatic carbons) 67.4, ($OCH_2$), 34.4, 31.9, 29.7, 29.6, 29.4, 29.2, 25.0, 22.7, 14.1.

UV (CHCl$_3$,1.13×10$^{-4}$ mol/L): $\lambda_{max}/\epsilon_{max}$ 265 nm/2.23× 10$^4$ mol$^{-1}$L cm$^{-1}$, 360 (sh) nm 1.33×10$^3$ mol$^{-1}$ L cm$^{-1}$.

Liquid Crystal Behaviour

Monomer 2d exhibited liquid crystal behaviour. Upon cooling from the isotropic liquid, POM microphotographs reveal a mosaic texture corresponding to a smetic B mesophase, followed, very quickly, by concentric arcs running across the backs of the mosaic platelets. The areas remain until the monomer 2d crystallized at 47.0° C., suggesting that a smectic E mesophase is formed over a long temperature range. Liquid crystal textures were observed both on heating and cooling cycles, suggesting that monomer 2d is an enantiotropic liquid crystal.

DSC analysis of polymer IX gave a sharp peak at 137.7° C. followed by a diffuse peak extending to 180° C. in the heating cycle. A sharp peak with a diffuse peak was similarly observed at 121.6° C. during the cooling cycle. POM observations indicate that the polymer IX melts at 142.0° C. and an isotropic liquid is formed at 175.0° C. Therefore, it appears that the sharp peak corresponds to a transition from the solid state to a smectic A mesophase (or vice versa). The diffuse peak may correspond to the smetic A mesophase to isotropic liquid state transition (or vice versa).

EXAMPLE 3

Poly (n-{[4'-{[(undecyl)carbonyl]oxy}biphenyl-4-yl)carbonyl]oxy}-1-alkyne), n=5,6(X)

Monomer Synthesis

Figure 3:
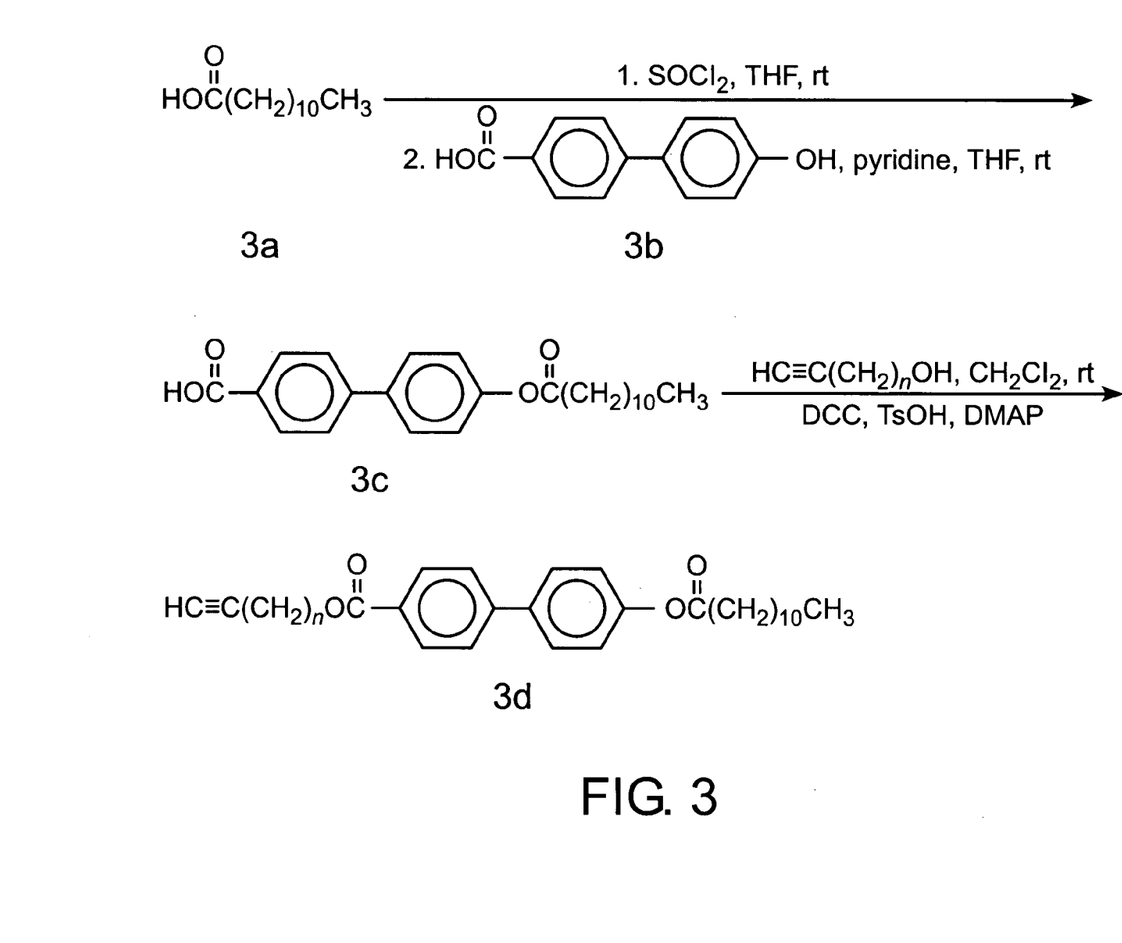
FIG. 3 shows a reaction scheme for the synthesis of n-{[4'-{[(undecyl)carbonyl]oxy}-biphenyl-4-yl)carbonyl]oxy}-1-alkynes.

The acetylene derivative were synthesised by the multiple step reactions shown in FIG. 3. Detailed experimental procedures and characterisation data are given below.

(((Undecyl)carbonyl)oxy)-4-biphenylcarboxylic acid(3c)

In a 100-mL, two-necked, round bottomed flask were added 4.0 g (20 mmol) of lauric acid, 3 mL of thionyl chloride and 20 mL of THF. After refluxing for 2 hours, the excess thionyl chloride was distilled off under reduced pressure. The solid left in the flask was dissolved in 20 mL of THF and cooled down using an ice bath. A solution of 4'-hydroxy-4-biphenylcarboxylic acid (4.5 g, 21 mmol) and pyridine (2 mL) in 30 mL of THF was injected into the flask and the mixture was slowly warmed up to room temperature and stirred overnight. THF was then distilled off using a rotary evaporator. Recrystallization of the solid residue from absolute ethanol gave 5.6 g of product. White crystals; yield: 69.6%., IR (KBr), $\nu(cm^{-1})$: 1746 ($CO_2Ar$), 1684 ($CO_2H$)

$^1H$ NMR (300 MHz, DMSO-$d_6$), δ(ppm): 13.01 (s, 1H, $CO_2$), 8.13 (d, 2H, Ar—H ortho to $CO_2H$), 7.80 (m, 4H, Ar—H), 7.30 (d, 2H, Ar—H ortho to $CO_2$ ($C_{11}H_{23}$), 2.70 (t, 2H, $CO_2CH_2$), 1.80 (m, 2H, $CO_2CH_2CH_2$), 1.40 [m, 16H, $(CH_2)_8$], 1.00 (t, 3H, $CH_3$)

$^{13}C$ NMR (75 MHz DMSO-$d_6$), δ (ppm): 171.8 ($CO_2C_{11}H_{23}$), 170.2 ($CO_2H$), 150.3 (aromatic carbon connected to $CO_2C_{11}H_{23}$), 143.5 (aromatic carbon para to $CO_2H$), 136.6 (aromatic carbon para to $CO_2C_{11}H_{23}$), 123.0 (aromatic carbons ortho to $CO_2H$), 129.8 (aromatic carbon connected to $CO_2H$). 128.2 (aromatic carbons meta to $CO_2H$), 126.8 (aromatic carbons meta to OCOR), 122.5 (aromatic carbons ortho to OCOR), 33.6 ($CH_2CO_2Ar$), 31.3 ($CH_2CH_2CH_3$), 29.1, 29.0, 28.8, 28.5, 24.5 ($CH_2CH_2CO_2Ar$), 22.2 ($CH_2CH_3$), 14.0 ($CH_3$).

n-{[(4'{[(Undecyl)carbonyl]oxy}-biphenyl-4-yl)carbonyl]oxy}-1-alkynes(3d; n=5,6)

Typical procedure for the syntheseis of 3d (n=3) is shown below: 4'-(((Undecyl)carbonyl)oxy)-4-biphenylcarboxylic acid (1.25 g, 3.2 mmol), 4-pentyn-1-ol (0.32 g, 3.8 mmol), TsOH (0.12 g 0.70 mmol) and DMAP (0.08 g, 0.65 mmol) were dissolved in 250 mL of dry dichloromethane in a 500-mL two-necked flask under nitrogen. The solution was cooled down to 0-5° C. with an ice-water bath, to which 0.98 g of DCC (4.75 mmol) in 50 mL of dichloromethane was added with stirring via a dropping funnel with a pressure equilization arm. The reaction mixture was stirred overnight. After filtering out the formed urea solid, the solution was concentrated by a rotary evaporator. The product was purified by silica-gel column using dichloromethane as eluent. After recrystallization from absolute ethanol, 1.09 g of product was obtained. Monomer 3d((n=6) was synthesized in a similar procedure.

Characterization for 3d(n=5): White crystals; yield: 64.6%

IR (KBr), $\nu$ (cm$^{-1}$): 3288 (≡C—H), 1746 ($CO_2C_{11}H_{23}$), 1714 ($C_5H_7CO_2$), 654 (m, ≡C—H) $^1H$ NMR (300 MHz, CDCl$_3$), δ (ppm): 8.1 (m, 2H, Ar—H ortho to $CO_2C_5H_7$), 7.6 (d, 4H, Ar—H), 7.2 (d, 2H, Ar—H ortho to $CO_2C_{11}H_{23}$), 4.5 (t, 2H, $CH_2OCO$), 2.8 (t, 2H, $OCOCH_2$), 2.4 (td, 2H, ≡CCH$_2$), 2.0 (m, 3H, $CH_2CH_2C≡$ and HC≡), 1.8 (m. 2H, $CH_2CH_2C_9H_{19}$), 1.6-1.4 [m, 16H, $(CH_2)_8$], 0.9 (t, 3H, $CH_3$).

$^{13}C$ NMR (75 MHz, CDCl$_3$), δ (ppm): 172.1 ($CO_2C_{11}H_{23}$), 169.3 ($C_5H_7CO_2$), 150.9 (aromatic carbon attached to $CO_2C_{11}H_{23}$), 144.8 (aromatic carbon para to $C_5H_7CO_2$), 137.5 (aromatic carbon para to $CO_2C_{11}H_{23}$), 130.1 (aromatic carbon ortho to $C_5H_7CO_2$), 129.0 (aromatic carbon attached to $C_5H_7CO_2$), 128.3 (aromatic carbons meta to $C_5H_7CO_2$), 127.0 (aromatic carbons meta to $CO_2C_{11}H_{23}$), 122.1 (aromatic carbons ortho to $CO_2C_{11}H_{23}$), 83.0 (≡C). 69.1 (HC≡), 63.5 ($CH_2OCO$), 34.4 ($OCOCH_2$), 31.9 ($CH_2CH_2CH_3$), 29.6, 29.4, 29.3, 29.2, 29.1, 27.7 (≡C—$CH_2CH_2$), 24.9 ($OCOCH_2CH_2$), 22.6 ($CH_2CH_3$), 15.4 ($CH_2C≡$), 14.0 ($CH_3$).

MS (CI): m/e 463.3 [(M+1)$^+$, calcd 463.3]

Anal. Calcd for $C_{30}H_{38}O_4$: C, 77.88; H, 8.28. Found C, 77.53; H, 7.85.

Polymerisation

The polymer was synthesized by a similar process to that described in Example 2, except that the polymerization process was conducted at 60° C. instead of room temperature. Characterisation for polymer X (n=5): Yellow powdery solid; yield: 84.05%. Mw: 37740, $M_w$: 1.9 (GPC polystyrene calibration).

IR (KBr), $\nu$(cm$^{-1}$): 1758 ($C_5H_7CO_2$), 1716 ($CO_2C_{11}H_{23}$).

$^1H$ NMR (300 MHz, CDCl$_3$), δ(ppm): 7.97, 7.42, 7.01 (Ar—H and trans HC≡C), 6.00 (cis ≡C—H), 4.36 ($CH_2OCOAr$), 2.63 ($CH_2CO_2$), 2.1 (≡CCH$_2$), 1.84 ($CH_2CH_2CO_2$, ≡CCH$_2CH_2$), 1.40 [$(CH_2)_8$], 1.00 ($CH_3$)

$^{13}C$ NMR (75 MHz, CDCl$_3$), δ(ppm): 171.8 ($CO_2C_{11}H_{23}$), 165.9 ($C_5H_7CO_2$), 150.5 (aromatic carbon attached to $CO_2C_{11}H_{23}$), 144.0 (aromatic carbon para to $C_5H_7CO_2$), 137.1 (aromatic carbon para to $CO_2C_{11}H_{23}$), 129.9 (aromatic carbons ortho to $C_5H_7CO_2$), 128.8 (aromatic carbon attached to $C_5H_7CO_2$), 128.0 (aromatic carbons meta to $C_5H_7CO_2$), 126.8 (aromatic carbons meta to $CO_2C_{11}H_{23}$), 121.8 (aromatic carbons ortho to $CO_2C_{11}H_{23}$), 64.3 ($CH_2OCO$), 34.3 ($CH_2CO_2$), 31.8 ($CH_2CH_2CH_3$), 29.6, 29.5, 29.3, 29.1, 24.8, 22.6 ($CH_2CH_3$), 14.0 ($CH_3$).

UV ($CHCl_3$, $9.00 \times 10^{-5}$ mol/L, $\lambda_{max}$(nm)/$\epsilon_{max}$(mol$^{-1}$L cm$^{-1}$): 277/2.56×10$^4$.

Liquid Crystal Behaviour

Of the monomers, 3d (n=5) exhibited a short temperature range (ca. 2° C.) monotropic smectic B mesophase. On cooling from the isotropic liquid, texture in the form of pseudo π-disclinations was observed with simultaneous crystallization. 3d (n=6) forms enantriotropic smectic A and smectic B mesophases upon cooling from the isotropic liquid. The temperature ramge of the mesophase is wide. DSC, POM and XRD analysis indicates that polymers X (n=5,6) form interdigitiated smectic A mesophases. Glass transition temperatures $T_g$ of ca. 100° C. were found.

EXAMPLE 4

Poly(n-{[( {[4'-[(nonyl)oxy]-biphenyl-4-yl)carbonyl]oxy}hexyl)oxy]carbonyl}-1-alkyne), n=4,10 (XI)

XI

Monomer Synthesis

Figure 4:
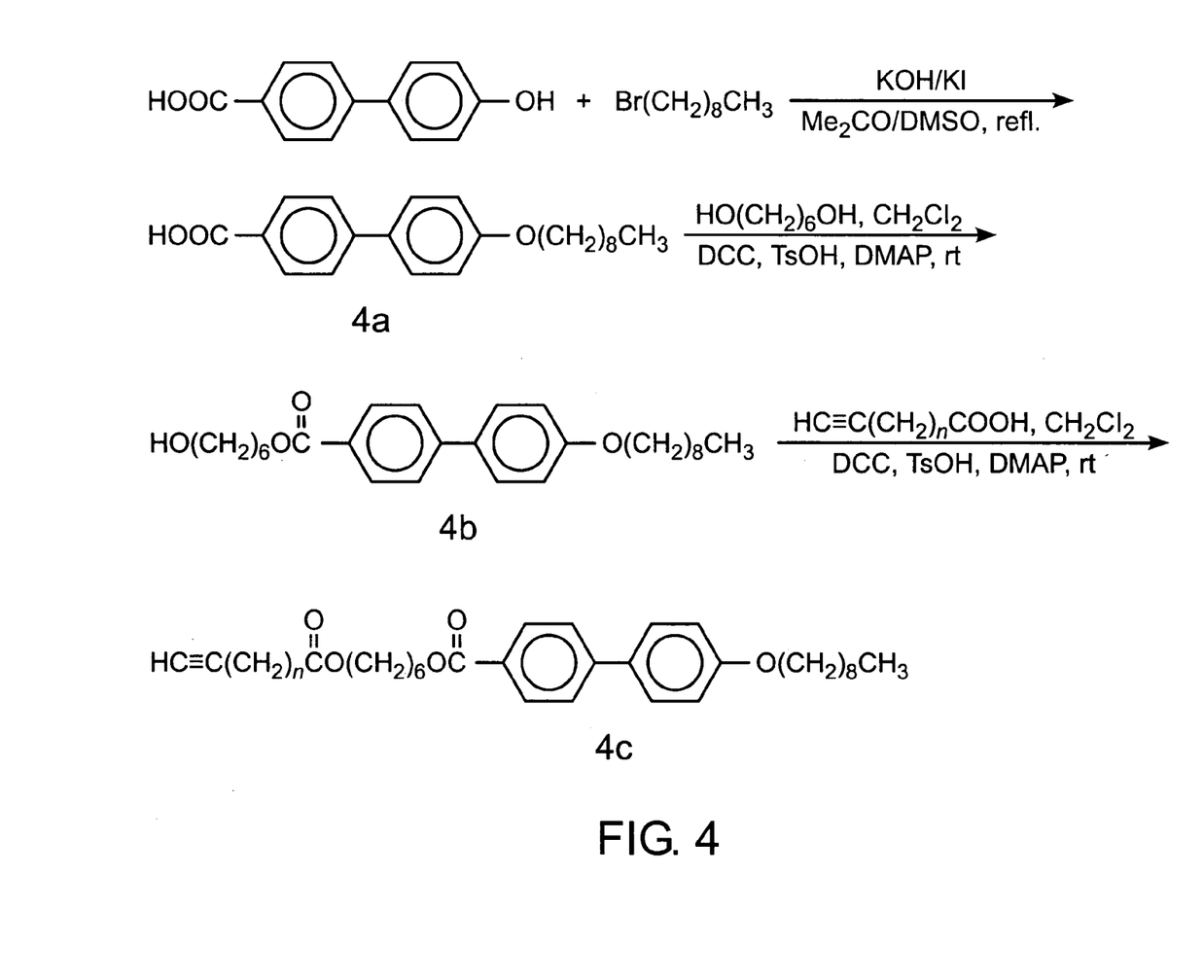
FIG. 4 shows a reaction scheme for the synthesis of n-{[({[4'-[(nonyl)oxy]-biphenyl-4-yl)carbonyl]oxy}hexyl)oxy]carbonyl}-1-alkynes.

The acetylene derivatives were synthesised by the multiple step reactions shown in FIG. 4. Detailed experimental procedures and characterisation data are given below.

4'-(Nonyl)oxy-4-biphenylcarboxylic acid(4a)

In a 500-mL Erlenmeyer flask equipped with a condenser, 3 g (14 mmol) of 4'-hydroxy-4-biphenylcarboxylic acid and 2 g of KOH (28 mmol) were dissolved in 300 mL of ethanol/water mixture (v/v: 6:1) under gentle heating and stirring. To the homogeneous solution was added 3 g of 1-bromononane (15 mmol) and a catalytic amount of KI and the resulting mixture was then refluxed for 30 h. The mixture was poured into 200 mL of water, acidified with 20 mL of 37% concentrated hydrochloric acid. The solid was collected by suction filtration and recrystallization in glacial acetic acid gave 3 g of product. White crystals; yield: 62%.

IR (KB4), ν(cm$^{-1}$): 3250–2500 (br, COOH), 1686 (C=O).

$^1$H NMR (300 MHz, DMSO-d$_6$), δ (ppm): 13.00 (s, 1H, COOH), 8.00 (d, 2H, Ar—H), 7.9 (m, 4H, Ar—H), 7.2 (d, 2H, Ar—H), 4.13 (5, 2H, OCH$_2$), 1.9 (m, 2H, OCH$_2$CH$_2$), 1.36 [m, 12H, (CH$_2$)$_6$], 1.00 t, 3H, CH$_3$)

$^{13}$C NMR (75 Mhz, DMSO-d$_6$), δ (ppm): 167.3 (COOH), 160.2 (aromatic carbon attached to OC$_9$H$_{19}$), 144.1 (aromatic carbon para to CO$_2$H), 131.2 (aromatic carbon para to OC$_9$H$_{19}$), 130.1 (aromatic carbons meta to CO$_2$H), 128.9 (aromatic carbon attached to CO$_2$H), 128.2 (aromatic carbons ortho to —CO$_2$H), 126.2 (aromatic carbons meta to OC$_9$H$_{19}$), 115.2 (aromatic carbons ortho to OC$_9$H$_{19}$), 67.7 (OCH$_2$), 31.3 (CH$_2$CH$_2$CH$_3$), 29.1, 28.9, 28.8, 25.6, 22.2 (CH$_2$CH$_3$), 14.1 (CH$_3$).

6-Hydroxy-1-hexyl[4'-(Heptyl)oxy-4-biphenyl]carboxylate(4b)

4'-((Nonyl)oxy)-4-biphenylcarboxylic acid (0.9 g, 2.6 mmol), 1,6-hexanediol (0.6 g, 5.4 mmol), TsOH (0.1 g, 0.5 mmol) and DMAP (0.07 g, 0.5 mmol) were dissolved in 200 mL of dry CH$_2$Cl$_2$ in a 500 mL two-necked flask under nitrogen. The solution was cooled down to 0–5° C. with an ice-water bath, to which 0.8 g (3.9 mmol) of DCC in 50 mL of CH$_2$Cl$_2$ was added with stirring via a dropping funnel with a pressure-equalization arm. The solution mixture was stirred overnight. After filtering out the formed urea solid, the solution was concentrated by a rotary evaporator. The product was purified by column chromatography using chloroform/acetone mixture (v/v: 10:1) as eluent followed by recrystallization from 70% aqueous ethanol solution. White solid; yield: 77.7%

IR (Kbr), ν(cm$_{-1}$): 3346 (br,OH), 1718 (C=O)

$^1$H NMR (300 MHz, CDCl$_3$), δ(ppm): 8.08 (d, 2H, Ar—H) 7.56 (m, 4H, Ar—H), 6.98 (d, 2H, Ar—H), 4.34 (t, 2H CH$_2$OCOAr), 4.00 (t, 2H OCH$_2$), 3.66 (t, 2H, HOCH$_2$), 1.80 (m, 4H, CH$_2$CH$_2$OCOAr and OCH$_2$CH$_2$), 1.64-1.25 [m, 18H, (CH$_2$)$_9$], 0.89 (t, 3H, CH$_3$)

$^{13}$C NMR (75 MHz, CDCl$_3$), δ (ppm): 166.6 (CO$_2$R), 159.5 (aromatic carbon attached to OC$_9$H$_{19}$), 145.3 (aromatic carbon para to CO$_2$R), 132.2 (aromatic carbon para to OC$_9$H$_{19}$), 130.1 (aromatic carbons meta to CO$_2$R), 128.5 aromatic carbon attached to CO$_2$R), 128.3 (aromatic carbons ortho to CO$_2$R), 126.4 (aromatic carbons meta to OC$_9$H$_{19}$), 115.0 (aromatic carbons ortho to OC$_9$H$_{19}$), 68.2 (OCH$_2$), 64.9 (CH$_2$OCOAr), 62.9 (HOCH$_2$), 32.7 (HOCH$_2$CH$_2$, 31.9 (CH$_2$CH$_2$CH$_3$), 29.5, 29.4, 29.3, 29.2, 28.8, 26.0 [HO (CH$_2$)$_3$ CH$_2$], 25.9[O(CH$_2$)$_2$CH$_2$], 25.4 [HO(CH$_2$)$_2$CH$_2$], 22.7 (CH$_2$CH$_3$), 14.1 (CH$_3$).

n-{[({[4'-[(Nonyl)oxy]-biphenyl-4-yl)carbonyl] oxy}hexyl)oxy]carbonyl}-1-alkyne (4c; n=4,10)

Typical procedure for the synthesis of 4c (n=4) is shown below: Into a 500 mL flask, 6-hydroxy-1-hexyl[4'-((Heptyl) oxy)-4-biphenyl]carboxylate (2 g, 4.5 mmol), 5-pentynoic acid (0.6 g, 4.5 mmol), DCC (1.9 g, 6.5 mmol), TsOH (0.2 g, 1 mmol) and DMAP (0.16 g, 1 mmol) were dissolved in 200 mL of CH$_2$Cl$_2$. After the solution was stirred for 24 h, the formed urea was filtered out and the solvent was removed by a rotary evaporator. The residue was separated by silica-gel column using chloroform as eluent. After recrystallization in absolute ethanol, 1.6 g of product was obtained. Monomer 4c (n=10) was synthesized by a similar process.

Characterisation for 4c (n=4): White solid, yield: 67.5%.

IR (KBr), ν (cm$^{-1}$): 3282 (s, ≡C—H), 1734 ($C_5H_5CO_2$) and 1712 ($CO_2Ar$), 630 (≡C—H) $^1$H NMR (300 MHz, $CDCl_3$), δ (ppm): 8.08 (d, 2H, Ar—H), 7.57 (m, 4H, Ar—H), 6.98 (d, 2H, Ar—H), 4.34 (t, 2H, $CH_2OCO$), 4.13 (t, 2H, $OCH_2$), 4.00 (t, 2H, $ROCOCH_2$), 2.52 (m, 4H, ≡C—$CH_2CH_2$ and ≡C—$CH_2$), 1.97 (t, 1H, HC≡), 1.82 (m, 4H, $CO_2CH_2CH_2$ and $CH_2CH_2OCO$), 1.71 (m, 2H, $OCH_2CH_2$), 1.49-1.29 [m, 16H, $(CH_2)_8$], 0.89 (t, 3H, $CH_3$). $^{13}$C NMR (75 MHz, $CDCl_3$), δ (ppm): 171.8 ($RCO_2R$), 166.6 ($RCO_2Ar$), 159.4 (aromatic carbon attached to $OC_9H_{19}$), 145.2 (aromatic carbon para to $CO_2R$), 132.2 (aromatic carbon para to $OC_9H_{19}$), 130.0 (aromatic carbons ortho to $CO_2R$), 128.4 (aromatic carbon attached to $CO_2R$), 128.3 (aromatic carbons meta to $OC_9H_{19}$), 126.4 (aromatic carbons meta to $CO_2R$), 114.9 (aromatic carbons ortho to $OC_9H_{19}$), 82.5 (≡C), 69.0 (HC≡), 68.1 ($OCH_2$), 64.8 ($CH_2OCOAr$), 64.7 ($ROCOCH_2$), 33.4 (≡C—$CH_2CH_2$), 31.9 ($CH_2CH_2CH_2$), 29.5 ($OCH_2CH_2$), 29.4 [$O(CH_2)_4CH_2$], 29.3 [$O(CH_2)_3CH_2$], 28.7 [$O(CH_2)_5CH_2$], 28.5 [$O(CH_2)_2CH_2$], 26.03, 25.74, 25.73, 25.7 ($CH_2CH_3$), 14.4 (≡C—$CH_2$), 14.1 ($CH_3$).

MS (CI): m/e 520.9 ($M^+$ calcd 520.3).

Anal. Calcd for $C_{33}H_{44}O_5$: C; 76.15, H; 8.46. Found: C; 77.29, H; 8.60.

Polymerisation

Polymerisation was performed using a $WCl_6/Ph_4Sn$ system substantially as described in Example 2.

Characterisation data for Polymer XI (n=4): Pale yellow powdery solid; yield: 53.1% $M_w$: 40070, $M_w/M_n$: 1.84 (GPC, polystyrene calibration).

IR (KBr), ν (cm$^{-1}$): 1716 ($CO_2R$)

$^1$H NMR (300 MHz, $CDCl_3$), δ (ppm): 8.02, 7.57, 6.92 (Ar—H and trans =C—H), 5.8 (cis =C—H), 4.29 ($CH_2OCOAr$), 4.07 ($OCH_2$), 3.98 ($RCO_2CH_2$), 2.60 (=C—$CH_2CH_2$), 2.60 (=C—$CH_2$), 1.78 ($OCH_2CH_2$), 1.45-1.31 ($CH_2)_8$, 0.92 ($CH_3$).

$^{13}$C NMR (75 MHz, $CDCl_3$), δ (ppm): 172.7 ($C_4H_5CO_2$), 166.3 ($ArCO_2$), 159.4 (aromatic carbon attached to $OC_9H_{19}$), 145.0 (aromatic carbon para to $C_4H_5CO_2$), 132.1 (aromatic carbon para to $OC_9H_{19}$), 131.6 (=C) 130.0 (aromatic carbon ortho to $C_4H_5CO_2$), 128.4 (aromatic carbon attached to $C_4H_5CO_2$), 128.3 (aromatic carbons meta to $OC_9H_{19}$), 126.2 (aromatic carbons meta to $C_4H_5CO_2$), 114.9 (aromatic carbons ortho to $OC_9H_{19}$), 68.1 ($OCH_2$), 64.8 ($CH_2OCOAr$), 64.3 ($RCO_2CH_2$), 31.9, 29.5, 29.4, 29.3, 29.2, 28.7, 26.0, 25.7, 22.7 ($CH_2CH_3$), 14.1 ($CH_3$).

UV ($CHCl_3$, 8.85×10$^{-5}$ mol/L), $\lambda_{max}$ (nm)/$\epsilon_{max}$ (mol$^{-1}$ Lcm$^{-1}$): 296/2.40×10$^4$.

Liquid Crystal Behaviour

Polymers X1 (n=4,10) exhibit a DSC peak corresponding to a transition from isotropic liquid to smectic A mesophase, and a further peak relating to a transition to a crystal state. POM micrographs reveal focal-conic texture in polymer XI (n=4) and Schlieren like texture in polymer XI (n=10).

EXAMPLE 5

Poly {n-[({[(4'-[(hexyl)oxy]-biphenyl-4-yl)oxy] hexy}oxy)carbonyl]-1-alkyne},n=5,10 (XII)

Monomer Synthesis

Figure 5:
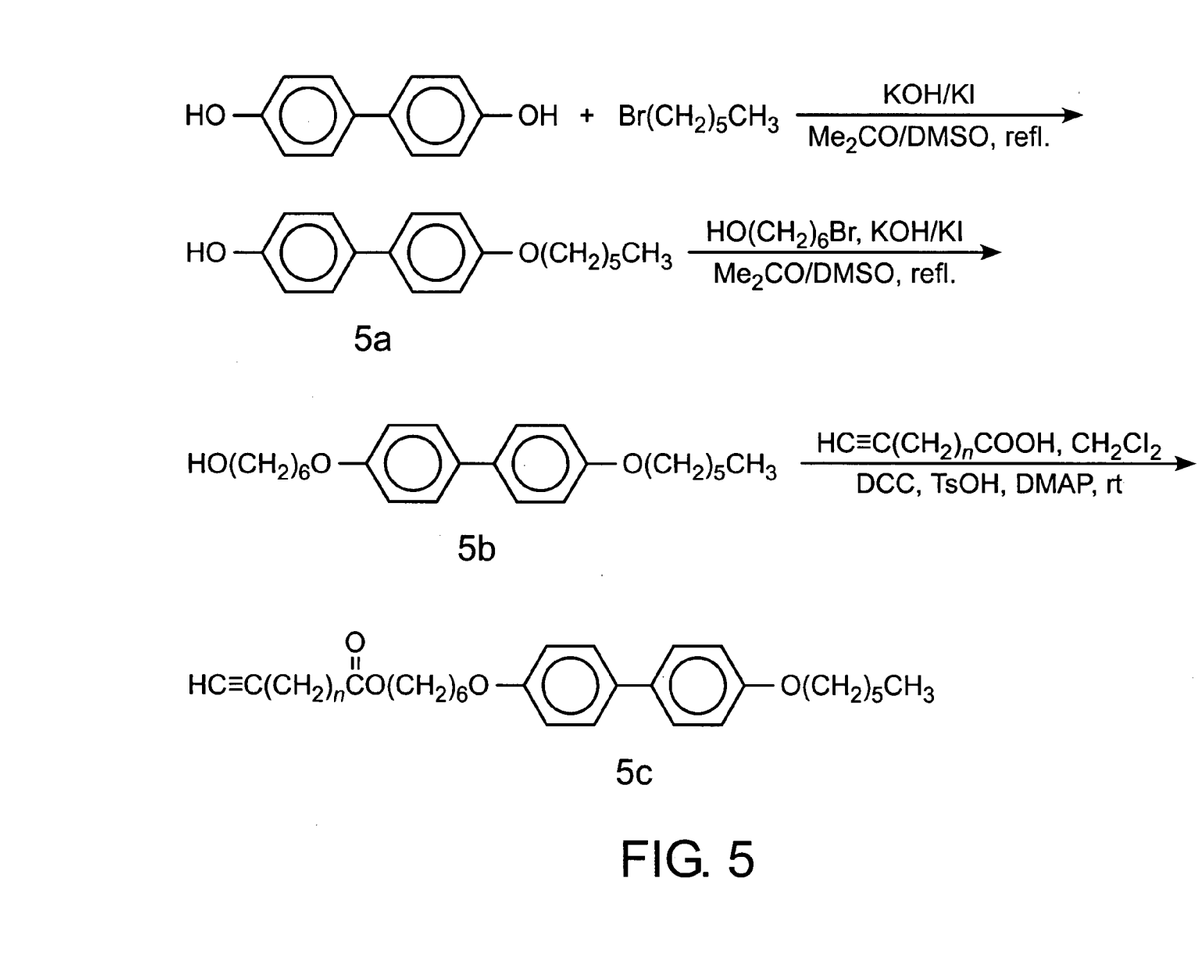
FIG. 5 shows a reaction scheme for the synthesis of n-[({[(4'-[(hexyl)oxy]-biphenyl-4-yl)oxy]hexyl}oxy)carbonyl]-1-alkynes.

The acetylene derivatives were synthesised according to the scheme shown in FIG. 5.

4'-Hydroxy-4-biphenylyl hexyl ether(5a)

Into a 500-mL Erlenmeyer flask equipped with a condenser, 4.1 g (22 mmol) of 4-4'-biphenol and 1.2 g (22 mmol) of KOH were dissolved in 250 mL acetone/DMSO mixture (v/v: 10:1). To the homogeneous solution were added 1.8 g (11 mmol) of 1-bromohexane and a catalytic amount of potassium iodide. The resulting mixture was refluxed for 24 h and the solution was poured into 150 mL of water, acidified with 15 mL of 37% concentrated hydrochloric acid. The precipitate was collected by suction filtration, washed with water and dried in vacuum oven. The crude product was purified on a silica-gel column using chloroform as eluent first, then a chloroform/acetone mixture (v/v: 10:1). Recrystallization from ethanol/water mixture (v/v: 3:1) gave 1.4 g of product. White crystals; yield: 42.9%.

IR (KBr), ν(cm$^{-1}$): 3298 (br, OH)

$^1$H NMR (300 MHz, $CDCl_3$), δ (ppm): 7.44 (m, 4H, Ar—H), 6.91 (m, 4H, Ar—H), 4.69 (s, OH), 3.99 (t, 2H, $OCH_2$), 1.80 (t, 2H, $OCH_2CH_2$), 1.52-1.29 [m, 6H, $(CH_2)_3$], 0.92 (t, 3H, $CH_3$).

$^{13}$C NMR (300 MHz, $CDCl_3$), δ (ppm): 158.3 (aromatic carbon attached to $OC_6H_{13}$), 154.6 (aromatic carbon attached to OH), 133.8, 133.2 (aromatic carbon para to $OC_6H_{13}$), 127.9, 127.7 (aromatic carbons meta to $OC_6H_{13}$), 115.6, 114.8 (aromatic carbons ortho to $OC_6H_{13}$), 68.1 ($OCH_2$), 31.6 ($CH_2CH_2CH_3$), 29.3, 25.7, 22.6 ($CH_2CH_3$), 14.0 ($CH_3$)

6-((4'-((Hexyl)oxy)-4-biphenylyl)oxy)-1-hexanol (5b)

Into a 500-mL Erlenmeyer flask equipped with a condenser, 3.6 g of 4'-hydroxy-4-biphenylyl hexyl ether (13.3 mmol), 2.4 g (13.3 mmol) of 6-bromo-hexan-1-ol, 0.8 g of KOH (13 mmol) and a catalytic amount of potassium iodide were dissolved in 250 mL of acetone/DMSO mixture (v/v: 10:1). The resulting mixture was refluxed for 24 h. The mixture was poured into 150 mL of water, acidified with 15 mL of 37% of concentrated hydrochloric acid. The precipitate was collected by suction filtration and dried in a vacuum oven.

Recrystallization from absolute ethanol gave 4.0 g of product. White solid; yield: 80.7% IR (KBr), ν (cm$^{-1}$): 3300 (br, OH)

$^1$H NMR (300 MHz, CDCl$_3$), δ (ppm): 7.46 (m, 4H, Ar—H), 6.94 (m, 4H, Ar—H), 4.00 (m, 4H, OCH$_2$), 3.67 (m, 2H, HOCH$_2$), 1.81 (m, 4H, OCH$_2$CH$_2$), 1.67–1.24 [m, 12H, (CH$_2$)$_6$], 0.92 (t, 3H, CH$_3$)

$^{13}$C NMR (75 MHz, CDCl$_3$), δ (ppm): 158.24 (aromatic carbon attached to OC$_6$H$_{13}$), 158.16, 133.4 (aromatic carbon para to C$_6$H$_{13}$O), 133.2, 127.7, 127.6 (aromatic carbon meta to OC$_6$H$_{13}$), 114.9, 114.8 (aromatic carbons ortho to OC$_6$H$_{13}$), 68.1, 67.9, (OCH$_2$C$_5$H$_{11}$), 62.9 (HOCH$_2$), 32.7 (HOCH$_2$CH$_2$), 31.6 (CH$_2$CH$_2$CH$_3$), 29.3 (OCH$_2$CH$_2$), 25.9, 25.7, 25.6, 22.6 (CH$_2$CH$_3$), 14.0 (CH$_3$)

n-[({[(4'-[(Hexyl)oxy]-biphenyl-4-yl)oxy]hexyl}oxy)carbonyl]-1-alkyne(5c; n=5, 10)

A general procedure for the synthesis of 5c (n=5) is given below: Into a 250-mL flask, 6-((4'-((hexyl)oxy)-4-biphenylyl)oxy)-1-hexanol (2.6 g, 7 mmol), 5-hexynoic acid (0.8 g, 7 mmol), DCC (2.1 g, 10 mmol), TsOH (0.3 g, 1.2 mmol) and DMAP (0.2 g, 1.2 mmol) were dissolved in 200 mL of CH$_2$Cl$_2$. After the solution was stirred at room temperature for 24 h, the formed urea was filtered out and the solvent was removed by rotary evaporator. The crude product was separated on a silica-gel column using CHCl$_3$ as eluent. Recrystallization from absolute ethanol gave 2.7 g of product.

Characterization for 5c (n=5): White solid; yield: 83.9% IR (KBr), ν (cm$^{-1}$): 3288 (s, HC≡), 1736 (C=O), 640 (≡C—H)

$^1$H NMR (300 MHz, CDCl$_3$), δ (ppm): 7.47 (d, 4H, Ar—H), 6.95 (m, 4H, Ar—H), 4.12 (t, 2H, CH$_2$OCOR), 4.00 (t, 4H, OCH$_2$), 2.47 (t, 2H, CH$_2$CO$_2$), 2.27 (td, 2H, ≡C—CH$_2$), 1.98 (t, 1H, HC≡), 1.90–1.34 [m, 12H, (CH$_2$)$_6$], 0.93 (t, 3H, CH$_3$)

$^{13}$C NMR (300 MHz, CDCl$_3$), δ (ppm): 173.10 (C=O), 158.20 (aromatic carbon attached to OC$_6$H$_{13}$), 158.10 (aromatic carbon attached to OC$_6$H$_{13}$R), 133.40 (aromatic carbon para to OC$_6$H$_{12}$R), 133.20 (aromatic carbon para to OC$_6$H$_{13}$), 127.62 (aromatic carbons meta to OC$_6$H$_{12}$R), 127.61 (aromatic carbons meta to OC$_6$H$_{13}$), 114.71 (aromatic carbons ortho to OC$_6$H$_{12}$R), 114.69 (aromatic carbons ortho to OC$_6$H$_{13}$), 83.30 (≡C), 69.10 (OCH$_2$), 68.00 (HC≡), 67.80 (CH$_2$OAr), 64.40 (CO$_2$CH$_2$), 32.90 (CH$_2$CO$_2$R), 31.60 (CH$_2$CH$_2$CH$_3$), 29.30 (OCH$_2$CH$_2$), 29.20, 28.60, 25.80, 25.73, 25.70, 23.60, 22.60 (CH$_2$CH$_3$), 17.80 (≡C—CH$_2$), 14.00 (CH$_3$)

MS (CI): m/e 465.2 [(M+1)$^+$ calcd 465.2]

Polymerisation

Polymerisation was performed using a WCl$_6$/Ph$_4$Sn system substantially as described in Example 2. The polymerisation of 5c (n=5) was performed at 60° C. owing to limited solubility in dioxane at room temperature.

Polymer XII (n=10) Characterisation data: Pale green powdery solid; yield: 86.3%.

$M_w$: 40860, $M_w/M_n$: 2.13

IR (KBr), ν (cm$^{-1}$): 1734 (C=O)

$^1$H NMR (300 MHz, CDCl$_3$), δ (ppm): 7.45, 6.94 (Ar—H and trans =C—H), 5.91 (cis =C—H), 4.11 (CH$_2$OCOR), 4.00 (OCH$_2$), 2.57 (=C—H), 2.32 (CH$_2$CO$_2$), 1.81–1.35 [(CH$_2$)$_{14}$], 0.94 (CH$_3$).

$^{13}$C NMR (75 MHz, CDCl$_3$), δ (ppm): 173.6 (C=O), 158.2, 158.1, 133.2, 127.53, 127.50, 114.6, 68.0, 67.72, 64.1, 34.2, 31.5, 29.2, 28.5, 25.70, 25.69, 24.9, 22.6, 14.0

UV (THF, 8.43×10$^{-5}$ mol/L): 268 nm/2.06×10$^4$ mol$^{-1}$ L cm$^{-1}$

Liquid Crystal Behaviour

Polymers XII (n=5, 10) exhibit a DSC peak corresponding to a transition from isotropic liquid to a smectic A mesophase, and a further peak relating a transition to a crystal state.

EXAMPLE 6

Poly[5-({[(4-{[(hexyl)oxy]phenyl}oxy)carbonyl]phenyl}oxy)-1-pentyne (XIII)

XIII

Figure 6:
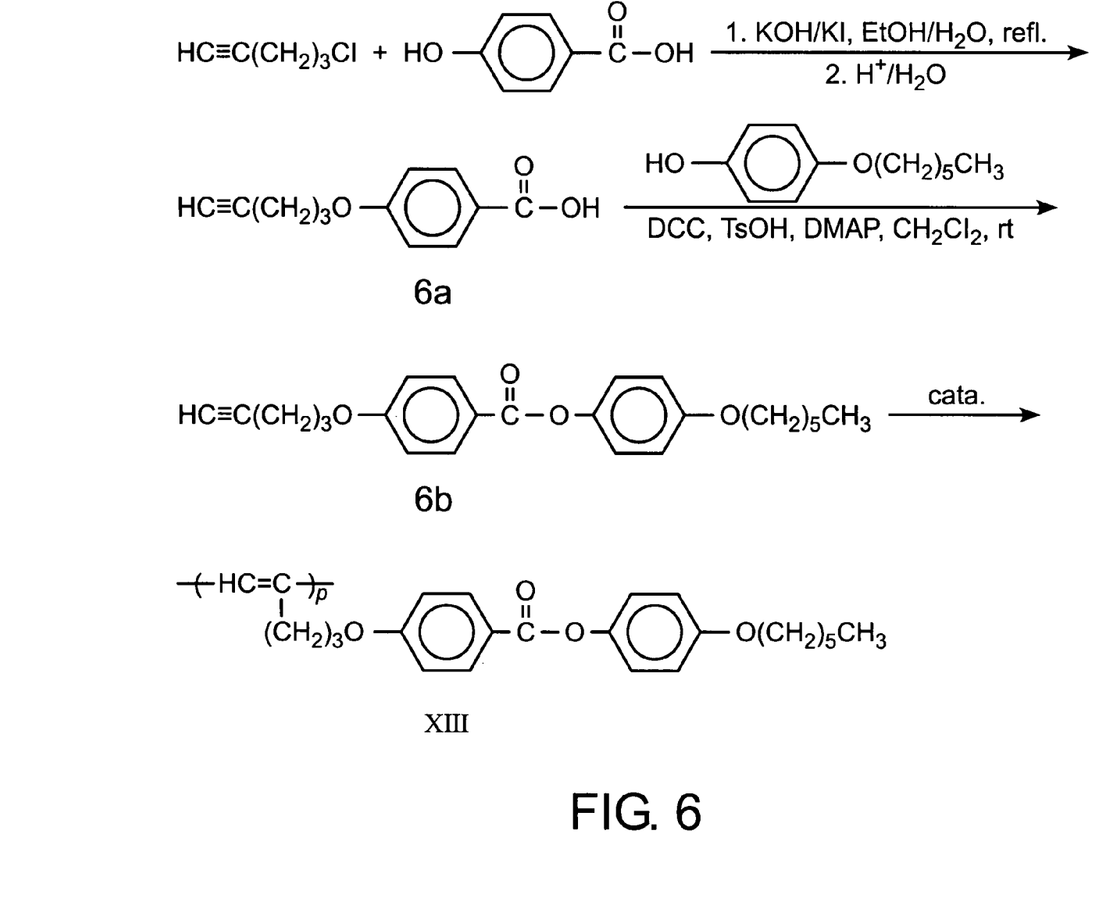
FIG. 6 shows a reaction scheme for the synthesis of polymer XIII.

Polymer XIII was synthesised according to the scheme shown in FIG. 6.

Monomer Synthesis

4-((5-Pentyn-1-yl)oxy)benzoic acid(6a)

In a 500 mL Erlenmeyer flask equipped with a condenser, 8.8 g (63.7 mmol) of 4-hydroxybenzoic acid and 7.2 g (128.3 mmol) of KOH were dissolved in 360 mL ethanol/water mixture (v/v: 6:1) under gentle heating and stirring. To the homogeneous solution were added 6.5 g (63.4 mmol) of 5-chloro-1-pentyne and a catalytic amount of potassium iodide, and the resulting mixture was then refluxed for 24 h. The mixture was poured into water, acidified with 20 mL of 37% hydrochloric acid. The solid was collected by suction filtration and washed with water. Recrystallization from absolute ethanol gave 4.5 g of product (yield: 34.8%).

IR (KBr), ν (cm$^{-1}$): 3300 (s, ≡C—H), 3200-2400 (br, CO$_2$H), 1688 (s, C=O).

$^1$H NMR (300 MHz, DMSO-d$_6$), δ (ppm): 12.71 (s, 1H, CO$_2$H), 7.99 (d, 2H, Ar—H ortho to CO$_2$H), 7.13 (d, 2H, Ar—H ortho to OC$_5$H$_7$), 4.20 (t, 2H, OCH$_2$), 2.91 (t, 1H, HC≡), 2.44 (td, 2H, ≡C—CH$_2$), 2.00 (m, 2H, CH$_2$CH$_2$CH$_2$).

$^{13}$C NMR (75 MHz, DMSO-d$_6$), δ (ppm): 167.6 (CO$_2$H), 162.6 (aromatic carbon attached to C$_5$H$_7$), 131.9 (aromatic carbons ortho to CO$_2$H), 123.4 (aromatic carbon attached to CO$_2$H), 114.8 (aromatic carbons ortho to OC$_5$H$_7$), 84.0 (≡C), 71.9 (OCH$_2$), 65.5 (HC≡), 27.8 (≡C—CH$_2$CH$_2$), 14.7 (≡C—CH$_2$)

5-{[({4-{[(Hexyl)oxy]phenyl]oxy}carbonyl)phenyl] oxy}-1-pentyne(6b)

4-((5-pentyn-1-yl)oxy)benzoic acid (4.4 g, 21.5 mmol), 4-hexyloxyphenol (4.6 g, 23.7 mmol), TsOH (0.9 g, 5.2 mmol) and DMAP (0.5 g, 4.1 mmol) were dissolved in 300 mL of dry dichloromethane in a 500-mL two-necked flask under nitrogen. The solution was cooled down to 0–5° C. with an ice-water bath, to which 6.7 g of DCC (27.9 mmol) in 70 mL of dichloromethane was added with stirring via a dropping funnel with a pressure-equalization arm. The reaction mixture was stirred overnight. After filtering out the formed urea solid, the solution was concentrated by a rotary evaporator. The product was purified by column chromatography using chloroform as eluent, followed by recrystallization from absolute ethanol. 7.0 g of product was obtained. White crystals; yield: 85.6%.

IR (KBr), ν (cm$^{-1}$): 3312 (s, ≡C—H), 1726 (C=O), 632 (s, ≡C—H)

$^1$H NMR (300 MHz, CDCl$_3$), δ (ppm): 8.13 (d, 2H, Ar—H ortho to CO$_2$Ph), 7.09 (d, 2H, ArH ortho to ArCO$_2$), 6.95 (m, 4H, Ar—H) 4.16 (t, 2H, CH$_2$OAr); 3.96 (t, 2H, PhOCH$_2$), 2.44 (td, 2H, ≡C—CH$_2$), 2.01 (m, 3H, ≡C—H and ≡CH$_2$CH$_2$), 1.76 (m, 2 H, OCH$_2$CH$_2$), 1.49–1.31 [m, 6H, (CH$_2$)$_3$], 0.93 (t, 2H, CH$_3$)

$^{13}$C NMR (75 MHz, CDCl$_3$), δ (ppm): 165.2 (C=O), 163.1 (aromatic carbon attached to OC$_5$H$_7$), 156.7 (aromatic carbon attached to OC$_6$H$_{13}$), 144.3 (aromatic carbon attached to ArCO$_2$), 132.2 (aromatic carbons ortho to CO$_2$Ph), 122.4 (aromatic carbons ortho to PhCO$_2$), 121.9 (aromatic carbon attached to CO$_2$Ph), 115.0 (aromatic carbons ortho to OC$_5$H$_7$), 114.2 (aromatic carbons ortho to OC$_6$H$_{13}$), 31.5, 29.2 (OCH$_2$CH$_2$), 27.9 (≡C—CH$_2$CH$_2$), 25.7, 22.5 (CH$_2$CH$_3$), 15.0 (≡C—CH$_2$), 14.0 (CH$_3$).

MS(CI): m/e 381.2 [(M+1)$^+$, calcd 381.2]

Anal. Calcd for C$_{24}$H$_{28}$O$_4$: C; 75.19, H; 7.36. Found: C; 74.19, H; 7.75

Polymerisation 310.0 mg of monomer 6b was polymerised using a WCl$_6$/Ph$_4$Sn system substantially as described in Example 2, and gave a red powdery solid; yield: 64.5%. M$_w$: 118300, M$_w$/M$_n$: 2.33 (GPC, polystyrene calibration).

IR (KBr), ν (cm$^{-1}$): 1734 (C=O)

$^1$H NMR (300 MHz, CDCl$_3$), δ (ppm): 8.04, 7.03, 6.86 (Ar—H and trans =C—H), 6.08 (cis =C—H), 3.92 (OCH$_2$), 2.54 (≡C—CH$_2$), 1.81 (=C—CH$_2$CH$_2$), 1.41 [(CH$_2$)$_4$], 0.99 (CH$_3$).

$^{13}$C NMR (75 MHz, CDCl$_3$), δ (ppm): 164.8 (C=O), 162.8, 156.8, 144.1, 132.1, 122.3, 114.8, 114.0 (aromatic carbons), 68.2, 67.5, 31.9, 29.2, 25.7, 22.5, 14.0

UV (THF, 8.95×10$^{-5}$ mol/L), λ$_{max}$ (nm)/ε$_{max}$ (mol$^{-1}$ L cm$^{-1}$): 261/2.33×10$^4$, 360 (sh), 1.34×10$^3$.

Liquid Crystal Behaviour

Monomer 6b exhibits an enantiotropic nematic mesophase; DSC reveals transition temperatures on cooling of 75.2 and 59.7° C. for isotropic to nematic and nematic to crystalline transitions, respectively (corresponding temperatures on heating are 77.4 and 65.2° C., respectively).

Polymer XII forms an enantiotropic interdigitated smectic A mesophase with weak side chain interactions. Typical focal conic texture is observed on cooling from the isotropic liquid. DSC reveals broad peaks at 209.0° C. during second heating and 198.7° C. during first cooling. These peaks correspond to the transitions from the smectic A mesophase to the isotropic liquid and vice versa.

The invention claimed is:

1. A polymer formed from at least a compound of the following formula

HCC—⌬—A(CH$_2$)$_n$B—⌬—⌬—C wherein n is greater than 1. and wherein A is selected from the group consisting of COO, OCO and O; B is selected from the group consisting of COO, OCO and O; and C is O(CH$_2$)$_6$CH$_3$.

2. A polymer according to claim 1 in which A is COO and B is OCO.

3. Poly{[4-({[6-({[4'-(heptyl)oxy-4-biphenylyl] carbonyl}oxy)hexyl]oxy}carbonyl)phenyl]acetylene}.

4. [4-({[6-({[4'-(heptyl)oxy-4-    -biphenylyl] carbonyl}oxy)hexyl]oxy}carbonyl)phenyl]acetylene.

5. A substituted acetylene having the formula HC≡C-spal-mes, where spal is a spacer group comprising an alkyl chain, and mes is a mesogenic substituent selected from the group consisting of:

A—⌬—⌬—OCOR

A—spa2—B—⌬—⌬—D wherein A, B and D are polar moieties, spa2 is a spacer group comprising an alkyl chain, and R is H or an alkyl group.

6. An acetylene according to claim 5 in which A and B are selected from the group consisting of: OCO, COO and O.

7. An acetylene according to claim 5 in which D is selected from the group consisting of: CN, OH, CO$_2$H, OR', COOR' and where R' is an alkyl group.

8. 5-{[(4'-{[(undecyl)carbonyl]oxy}-biphenyl-4-yl)carbonyl]joxy}-1-pentyne.

9. 6-{[(4'-{[(undecyl)carbonyl]oxy}-biphenyl-4-yl)carbonyl]oxy}-1-hexyne.

10. 5-[(4'-{[(undecyl)carbonyl]oxy}-biphenyl-4-yl) oxy]-1-pentyne.

11. 4-{[({[(4'-[(nonyl)oxy]-biphenyl-4-yl)carbonyl] oxy}hexyl)oxy]carbonyl}-1-butyne.

12. 10-{[({[(4'-[(nonyl)oxy]-biphenyl-4-yl)carbonyl]oxy}hexyl)oxy]carbonyl}-1-decyne.

13. 5-[({[(4'-[(hexyl)oxy]-biphenyl-4-yl)oxy]hexyl}oxy)carbonyl]-1-pentyne.

14. 10-[({[(4'-[(hexyl)oxy]-biphenyl-4-yl)oxy]hexyl}oxy)carbonyl]-1-decyne.

15. 5-( {[(4-{[hexyl)oxy]phenyl}oxy)carbonyl]phenyl}oxy)- 1-pentyne.

16. A polyacetylene polymer polymerised from a substituted acetylene monomer according to claim 5.

17. A liquid crystalline polyacetylene polymerised from a substituted acetylene monomer according to claim 5.

18. An acetylene according to claim 5 in liquid crystalline form.

19. A compound having the following formula wherein n is greater than 1, and wherein A is selected from the group consisting of COO, OCO and O; B is selected from the group consisting of COO, OCO and O; and C is $O(CH_2)_6CH_3$.

* * * * *